United States Patent
Ott et al.

(10) Patent No.: US 12,173,631 B2
(45) Date of Patent: Dec. 24, 2024

(54) SYSTEM AND METHOD FOR MONITORING AN OXIDATION CATALYST

(71) Applicant: PACCAR Inc, Bellevue, WA (US)

(72) Inventors: Trevor Joseph Ott, Anacortes, WA (US); Cynthia Chaffin Webb, Sedro-Woolley, WA (US); Charles Wayne Reinhardt Swart, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 18/440,570

(22) Filed: Feb. 13, 2024

(65) Prior Publication Data

US 2024/0183303 A1 Jun. 6, 2024

Related U.S. Application Data

(63) Continuation of application No. 17/504,595, filed on Oct. 19, 2021, now Pat. No. 11,946,400.

(51) Int. Cl.
| | |
|---|---|
| *F01N 11/00* | (2006.01) |
| *F01N 3/10* | (2006.01) |
| *F01N 3/20* | (2006.01) |
| *F01N 13/00* | (2010.01) |

(52) U.S. Cl.
CPC ............ *F01N 11/002* (2013.01); *F01N 3/103* (2013.01); *F01N 3/2013* (2013.01); *F01N 3/208* (2013.01); *F01N 13/008* (2013.01); *F01N 2900/1404* (2013.01); *F01N 2900/1411* (2013.01)

(58) Field of Classification Search
CPC ...... F01N 11/002; F01N 3/103; F01N 3/2013; F01N 3/208; F01N 13/008; F01N 2900/1404; F01N 2900/1411
See application file for complete search history.

(56) References Cited

U.S. PATENT DOCUMENTS

| | | | | |
|---|---|---|---|---|
| 9,664,131 | B2 * | 5/2017 | Nagaoka | .................. F01N 3/36 |
| 2006/0225492 | A1 * | 10/2006 | Pfister | ................ F02D 41/1445 |
| | | | | 73/114.75 |
| 2010/0269489 | A1 * | 10/2010 | LaRose, Jr. | ............ F01N 9/002 |
| | | | | 60/285 |
| 2011/0143449 | A1 * | 6/2011 | Lana | ................... G01M 15/102 |
| | | | | 422/82.12 |

(Continued)

FOREIGN PATENT DOCUMENTS

EP 2987974 A1 2/2016

*Primary Examiner* — Matthew T Largi
(74) *Attorney, Agent, or Firm* — Seed IP Law Group LLP

(57) ABSTRACT

A lean-burn internal combustion engine and an exhaust aftertreatment system having an oxidation catalyst are described. A controller determines a fueling rate and a mass flowrate of the exhaust gas feedstream. An inlet temperature of the exhaust gas feedstream upstream of the oxidation catalyst is determined via the first temperature sensor, and an in-use outlet temperature of the exhaust gas feedstream is determined downstream of the oxidation catalyst via the second temperature sensor. An expected outlet temperature from the oxidation catalyst is determined based upon the inlet temperature, the fueling rate, and the mass flowrate of the exhaust gas feedstream. The oxidation catalyst is evaluated based upon the expected outlet temperature and the in-use outlet temperature.

11 Claims, 3 Drawing Sheets

(56) References Cited

U.S. PATENT DOCUMENTS

| | | | |
|---|---|---|---|
| 2011/0296816 A1* | 12/2011 | Parmentier | F01N 11/005 60/274 |
| 2012/0180456 A1* | 7/2012 | Yamada | F02D 41/047 60/274 |
| 2012/0227380 A1* | 9/2012 | Oemke | F01N 13/02 60/274 |
| 2014/0000241 A1* | 1/2014 | Baier | F01N 13/0093 60/274 |
| 2014/0060014 A1* | 3/2014 | Gonze | F01N 3/106 60/286 |
| 2016/0169076 A1* | 6/2016 | Maertens | F01N 13/008 73/114.75 |
| 2018/0230885 A1* | 8/2018 | Khaled | F01N 3/106 |

* cited by examiner

SYSTEM AND METHOD FOR MONITORING AN OXIDATION CATALYST

CROSS REFERENCE TO RELATED APPLICATIONS

This application is a continuation of U.S. patent application Ser. No. 17/504,595, filed Oct. 19, 2021, which is incorporated herein by reference in its entirety.

BACKGROUND

Technical Field

Exhaust aftertreatment systems fluidly couple to internal combustion engines to purify exhaust gases that are generated as byproducts of combustion. Byproducts of combustion may include unburned hydrocarbons, carbon monoxide, nitrides of oxide (NOx), and particulate matter. Exhaust aftertreatment systems may include one of or combinations of oxidation catalysts, reduction catalysts, selective catalytic reduction catalysts, particulate filters, and other devices. When employed on heavy-duty diesel engines or other lean-burning configurations, an exhaust aftertreatment system may include a diesel oxidation catalyst (DOC) to oxidize nitric oxide (NO), a diesel particulate filter (DPF) for control of particulate matter (PM), one or more selective catalytic reduction (SCR) systems for NOx reduction, and/or an ammonia oxidation catalyst to eliminate or minimize ammonia slip. Operation of the internal combustion engine and the exhaust aftertreatment system may be monitored by one or more sensing devices that are disposed in the exhaust gas feedstream. Operation may also be determined employing simulation models that dynamically execute during operation.

Description of the Related Art

Selective catalytic reduction catalysts (SCRs) may employ reductants for reducing NOx molecules to elemental nitrogen. One reductant is urea, which may be transformed into ammonia (NH3) in an exhaust system. The reductant may be injected into the exhaust gas feedstream upstream of one or multiple SCR catalysts, and may be stored on a surface or otherwise captured for use in reducing NOx molecules to elemental nitrogen and water. Performance of SCR catalysts is dependent upon temperature, with increased performance being related to increased exhaust gas temperatures.

There is a need to provide a hardware architecture implementation and method to monitor performance of elements of the exhaust aftertreatment system, including the oxidation catalyst, to improve heavy-duty diesel NOx emissions.

BRIEF SUMMARY

A vehicle system is described that includes a lean-burn internal combustion engine and an exhaust aftertreatment system having an oxidation catalyst. A first temperature sensor is arranged to monitor an exhaust gas feedstream upstream of the oxidation catalyst, and a second temperature sensor is arranged to monitor the exhaust gas feedstream downstream of the oxidation catalyst. A controller is in communication with the internal combustion engine and the first and second temperature sensors. The controller includes an instruction set that is executable to determine a fueling rate and a mass flowrate of the exhaust gas feedstream. An inlet temperature of the exhaust gas feedstream upstream of the oxidation catalyst is determined via the first temperature sensor, and an in-use outlet temperature of the exhaust gas feedstream is determined downstream of the oxidation catalyst via the second temperature sensor. An expected outlet temperature from the oxidation catalyst is determined based upon the inlet temperature, the fueling rate, and the mass flowrate of the exhaust gas feedstream. The oxidation catalyst is evaluated based upon the expected outlet temperature and the in-use outlet temperature.

An aspect of the disclosure includes determining a fueling rate and a mass flowrate of the exhaust gas feedstream, and determining the expected outlet temperature from the oxidation catalyst based upon the inlet temperature, the fueling rate, and the mass flowrate.

Another aspect of the disclosure includes determining a temperature differential through the oxidation catalyst based upon the fueling rate and the mass flowrate of the exhaust gas feedstream.

Another aspect of the disclosure includes determining the expected outlet temperature from the oxidation catalyst based upon the inlet temperature and the temperature differential through the oxidation catalyst.

Another aspect of the disclosure includes an exhaust gas heater being arranged in the exhaust gas feedstream upstream of the oxidation catalyst.

Another aspect of the disclosure includes controlling, via the exhaust gas heater, the inlet temperature upstream of the oxidation catalyst, determining the temperature differential through the oxidation catalyst based upon the fueling rate and the mass flowrate of the exhaust gas feedstream, and determining the expected outlet temperature from the oxidation catalyst based upon the temperature differential through the oxidation catalyst and the inlet temperature upstream of the oxidation catalyst.

Another aspect of the disclosure includes evaluating performance of the oxidation catalyst and detecting a fault related to the oxidation catalyst when a difference between the expected outlet temperature from the oxidation catalyst and the in-use outlet temperature is greater than a threshold.

It is appreciated that the fault related to the oxidation catalyst may include a degradation in catalytic performance of the oxidation catalyst due to poisoning or washcoat deterioration, occurrence of an exhaust leak, or due to another reason.

Another aspect of the disclosure includes evaluating the performance of the oxidation catalyst based upon a comparison of an expected light-off temperature for the oxidation catalyst and the in-use light-off temperature for the oxidation catalyst wherein the in-use light-off temperature for the oxidation catalyst is determined based upon the in-use outlet temperature downstream of the oxidation catalyst.

Another aspect of the disclosure includes controlling, via the exhaust gas heater, the inlet temperature upstream of the oxidation catalyst, controlling the fueling rate and the mass flowrate of the exhaust gas feedstream, and determining a temperature differential through the oxidation catalyst based upon the fueling rate and the mass flowrate of the exhaust gas feedstream. The expected outlet temperature from the oxidation catalyst is determined based upon the inlet temperature and the temperature differential through the oxidation catalyst.

Another aspect of the disclosure includes a method for monitoring an oxidation catalyst that is arranged upstream of an SCR catalyst in an exhaust gas feedstream of a compression-ignition internal combustion engine that includes determining, via a first temperature sensor, an inlet temperature upstream of the oxidation catalyst and determining, via a second temperature sensor, an in-use outlet temperature downstream of the oxidation catalyst. An expected outlet temperature from the oxidation catalyst is determined based upon the inlet temperature. A fault related to the oxidation catalyst is determined based upon the expected outlet temperature from the oxidation catalyst and the in-use outlet temperature downstream of the oxidation catalyst.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE SEVERAL VIEWS OF THE DRAWINGS

One or more embodiments will now be described, by way of example, with reference to the accompanying drawings, in which.

Figure 1:
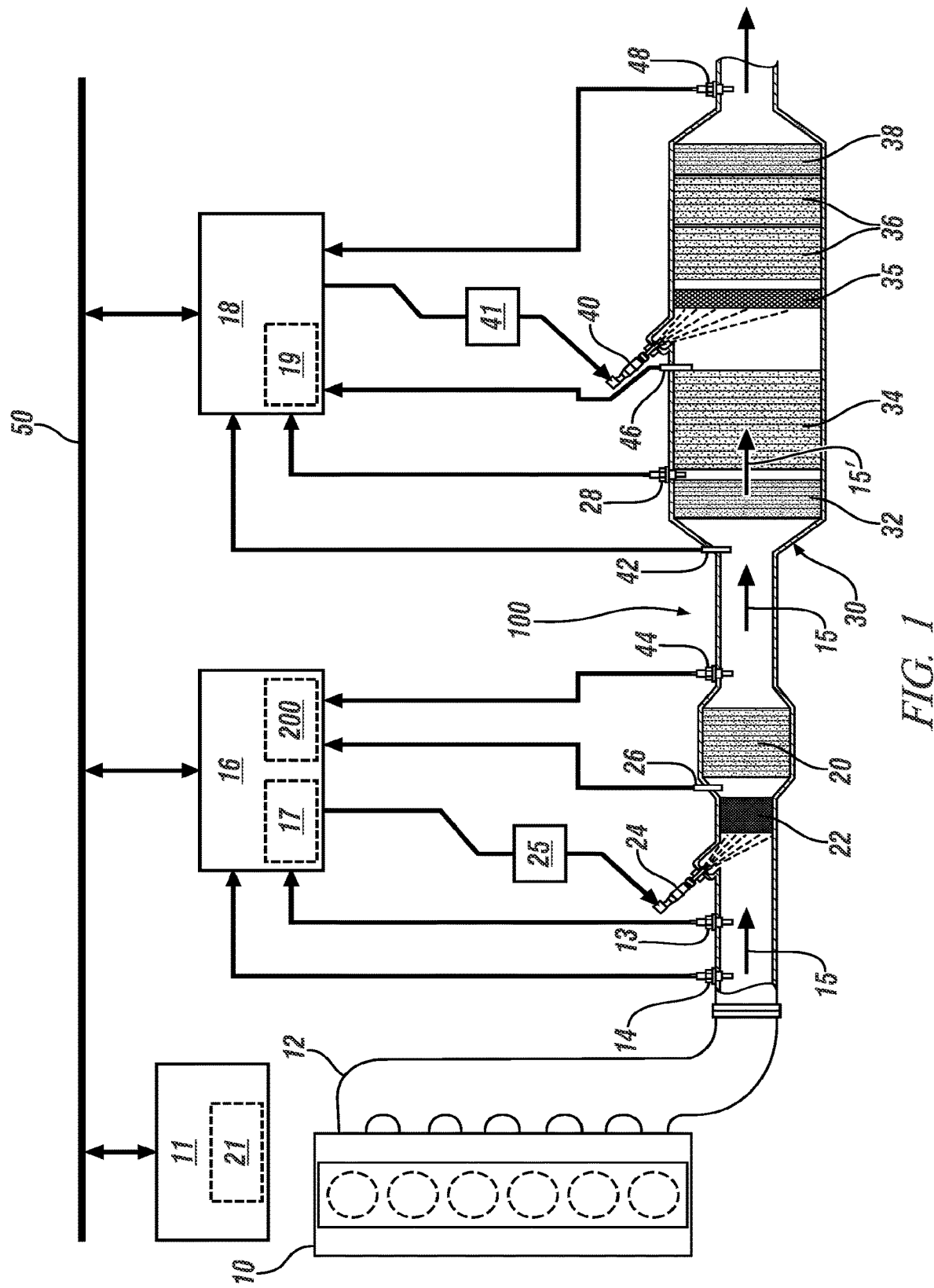
FIG. 1 schematically illustrates an internal combustion engine and an exhaust aftertreatment system including an oxidation catalyst, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. Throughout the drawings, corresponding reference numerals indicate like or corresponding parts and features. As used herein, the terms "system" and "subsystem" may refer to one of or a combination of mechanical and electrical devices, actuators, sensors, controllers, application-specific integrated circuits (ASIC), combinatorial logic circuits, software, firmware, and/or other components that are arranged to provide the described functionality. As employed herein, the term "upstream" and related terms refer to elements that are towards an origination of a flow stream relative to an indicated location, and the term "downstream" and related terms refer to elements that are away from an origination of a flow stream relative to an indicated location. The term 'model' refers to a processor-based or processor-executable code and associated calibration that simulates a physical existence of a device or a physical process. The use of ordinals such as first, second and third does not necessarily imply a ranked sense of order, but rather may only distinguish between multiple instances of an act or structure.

Referring to the drawings, wherein like reference numerals correspond to like or similar components throughout the several Figures, FIG. 1, consistent with embodiments disclosed herein, schematically illustrates elements of an embodiment of an exhaust aftertreatment system 100 for purifying the exhaust gas feedstream 15 of an internal combustion engine 10, wherein the internal combustion engine 10 is controlled to operate primarily in a lean-burn air/fuel ratio combustion environment. The exhaust aftertreatment system 100 is configured to purify the exhaust gas feedstream 15 to achieve target tailpipe emissions in-use.

One example of the internal combustion engine 10 is a multi-cylinder compression-ignition internal combustion engine that is classified as a heavy-duty (HD) engine that operates at a lean air/fuel ratio that ranges between a 20:1 air/fuel ratio and a 60:1 air/fuel ratio. In one embodiment, the internal combustion engine 10 is disposed on a vehicle. The vehicle may include, but not be limited to a mobile platform in the form of a heavy-duty commercial vehicle, an industrial vehicle, an agricultural vehicle, a watercraft, or a train. Alternatively, the internal combustion engine 10 may be arranged as a stationary device, such as for powering an electric power generator. Operation of the internal combustion engine 10 is controlled by an engine controller 11.

The exhaust gas feedstream 15 generated by the internal combustion engine 10 may contain various byproducts of combustion, including unburned hydrocarbons, carbon monoxide, nitrides of oxide (NOx), particulate matter, etc. The exhaust gas feedstream 15 is monitored by a first oxygen sensor 13, and in some embodiments, a second engine-out exhaust gas sensor that is referred to hereinafter as a first NOx sensor 14. In one embodiment, the first oxygen sensor 13 is a wide-band oxygen sensor that is capable of monitoring the exhaust gas feedstream 15 over a range of air/fuel ratios from less than 20:1 to greater than 60:1. The first NOx sensor 14 is an engine-out exhaust gas sensor that is capable of monitoring NOx constituents in the exhaust gas feedstream 15 for purposes of monitoring and/or controlling operation of the engine 10 and monitoring one or more elements of the exhaust aftertreatment system 100. In one embodiment, the first NOx sensor 14 may be supplemented by or supplanted with a controller-executed algorithmic model that is capable of estimating NOx constituents in the exhaust gas feedstream 15 based upon engine operating parameters. In addition, there may be one or more other engine-out exhaust gas sensors (not shown) that are capable of monitoring one or multiple constituents of the exhaust gas feedstream 15, including, e.g., another NOx sensor, a temperature sensor, etc.

Engine control includes controlling various engine operating parameters, including controlling engine control states to minimize various exhaust gas constituents through chemical reaction processes that include, by way of non-limiting examples, oxidation, reduction, filtering, and selective reduction. Other engine control states include controlling operating parameters to warm up the engine 10 and control heat transfer to various elements of the exhaust aftertreatment system 100 to effect efficacious operation thereof. Heat transfer to the elements of the exhaust aftertreatment system 100 may be employed for warmup and catalyst light-off, regeneration of a particulate filter, etc.

The exhaust aftertreatment system 100 includes, in one embodiment, a first selective catalytic reduction (SCR) catalyst 20 that is arranged upstream of an exhaust subsystem 30. In some embodiments, the exhaust aftertreatment system 100 includes only the exhaust subsystem 30.

When the exhaust aftertreatment system 100 includes only the exhaust subsystem 30, it is configured to purify the exhaust gas feedstream 15 of the internal combustion engine 10 to achieve a first tailpipe emissions target in-use. When the exhaust aftertreatment system 100 includes the first SCR catalyst 20 upstream of the exhaust subsystem 30, it is configured to purify the exhaust gas feedstream 15 to achieve a second tailpipe emissions target in-use, wherein the second tailpipe emissions target is less than the first tailpipe emissions target that is achievable with the exhaust subsystem 30 alone. The tailpipe emissions targets may in the form of regulatory emissions targets that are imposed by the US Environmental Protection Agency, the California Air Resources Board, the European Union, or other regulatory bodies. The tailpipe emissions targets may instead be in the form of in-house or user emissions targets, such as may be imposed by a private fleet owner.

The first SCR catalyst 20 may be placed in an engine compartment in an underhood location, and thus may be closely coupled to the engine 10. The first SCR catalyst 20 may be fluidly coupled to an exhaust manifold 12 of the engine 10, or to a fluid outlet of a turbocharger or supercharger of the engine 10. Alternatively, the first SCR catalyst 20 may be located underbody.

A first reductant delivery system 25 is arranged to inject a reductant into the exhaust gas feedstream upstream of the first SCR catalyst 20. Operation of the first reductant delivery system 25 may be controlled by a first controller 16. The first reductant delivery system 25 includes, in one embodiment, a single reductant injector 24 having an injection nozzle that is positioned to inject reductant into the exhaust gas feedstream upstream of the first SCR catalyst 20. The first reductant delivery system 25 is configured to controllably supply a metered flow of reductant into the exhaust gas feedstream 15 upstream of the first SCR catalyst 20 to facilitate NOx reduction therethrough. The first controller 16 is operatively connected to the first reductant delivery system 25 and in communication with the first NOx sensor 14 and a first temperature sensor 26. The first controller 16 includes a first instruction set 17 that is executable to control the first reductant delivery system 25 to inject reductant into the exhaust gas feedstream 15 upstream of the first SCR catalyst 20 based upon inputs from the first NOx sensor 14, and a second, downstream NOx sensor 48 that is arranged to monitor the exhaust gas feedstream at the tailpipe downstream of the exhaust subsystem 30, and other sensors.

In one embodiment, a first heating device 22 is arranged to transfer heat to the exhaust gas feedstream upstream of the first SCR catalyst 20. In one embodiment, the first heating device 20 is a controllable heating element that is arranged in the exhaust gas feedstream 15 upstream of the first SCR catalyst 20. The first heating device 22 may be an electrically-powered resistive heater or heating element, a burner, or another heater, to inject heat energy into the exhaust gas flow and the injected reductant. In one embodiment, a first temperature sensor 26 is arranged to monitor temperature of the exhaust gas feedstream 15 upstream of the first SCR catalyst 20. In one embodiment, a third exhaust gas sensor 44 is arranged to monitor the exhaust gas feedstream 15 downstream of the first SCR catalyst 20. In one embodiment, the third exhaust gas sensor 44 monitors constituents in the exhaust gas feedstream 15 for purposes of monitoring and/or controlling operation of the engine 10 and/or the first reductant delivery system 25. The third exhaust gas sensor 44 may be configured to monitor one or more constituents of the exhaust gas feedstream 15, including, e.g., NOx sensor, a wide-range air/fuel, etc. In one embodiment, a second oxidation catalyst (not shown) is arranged upstream of the first SCR catalyst 20. The first controller 16 interfaces and communicates with other controllers, e.g., second controller 18 and an engine controller, via a communication bus 50.

The term "controller" and related terms such as microcontroller, control, control unit, processor, etc., refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, e.g., communication bus 50, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

In one embodiment, the first SCR catalyst 20 is a catalytic element that employs a reductant to reduce NOx molecules to form elemental nitrogen (N2) and other inert gases. In one embodiment, the reductant is urea, which can be converted to ammonia (NH3) that is stored on the substrate of the first SCR catalyst 20. Alternatively, the reductant may be gaseous ammonia. The first SCR catalyst 20 includes a ceramic or metallic substrate having flow channels that have been coated with suitable materials that include by way of non-limiting examples: metals, such as vanadium, copper, cerium, and/or other materials. The coated materials effect chemical reactions to reduce, in the presence of ammonia, NOx molecules in the exhaust gas feedstream to form elemental nitrogen (N2) and other inert gases, under certain conditions of the exhaust gas feedstream related to temperature, flowrate, air/fuel ratio and others.

The exhaust subsystem 30 includes a plurality of fluidly connected exhaust purifying elements for purifying engine exhaust gas prior to expulsion out the tailpipe to ambient air. An exhaust purifying element is a device that is configured to oxidize, reduce, filter and/or otherwise treat constituents of the exhaust gas feedstream 15, including but not limited to hydrocarbons, carbon monoxide, nitrides of oxygen (NOx), particulate matter, and ammonia. In the non-limiting embodiment shown, first, second, third, and fourth exhaust purifying elements 32, 34, 36, and 38, respectively, are arranged in series.

The first exhaust purifying element 32 is an oxidation catalyst for oxidizing NO and other constituents in the exhaust gas feedstream 15, in certain embodiments, and is referred to hereafter as an oxidation catalyst 32.

The second exhaust purifying element 34 is a particulate filter for filtering particulate matter from the exhaust gas feedstream, in one embodiment.

The third exhaust purifying element 36 is a selective catalyst reduction (SCR) catalyst, i.e., a second SCR catalyst 36 in one embodiment. In one embodiment, the second SCR catalyst 36 is a urea-based device that employs gaseous ammonia to react with and reduce NOx molecules to form elemental nitrogen (N2) and other inert gases. The injected reductant may be urea, which can be converted to ammonia (NH3), and stored on the substrate of the second SCR catalyst 36 to react with and reduce NOx molecules. A second reductant delivery system 41 is arranged to inject reductant into the exhaust gas feedstream 15' upstream of the second SCR catalyst 36.

In one embodiment, a second heating element 35 may be interposed in the exhaust gas feedstream downstream of the second exhaust purifying element 34 and upstream of the third exhaust purifying element 36, and may be, in one embodiment, an electrically-powered resistive heater or heating element, a burner, or another heater, to inject heat energy into the exhaust gas flow and the injected reductant.

The fourth exhaust purifying element 38 may be an ammonia oxidation catalyst that is arranged downstream of the second SCR catalyst 36, and operates to oxidize unused ammonia from the second SCR catalyst 36 to eliminate or minimize ammonia slip in one embodiment.

The second reductant delivery system 41 includes, in one embodiment, a second reductant injector 40 having an injection nozzle that is positioned to inject reductant into the exhaust gas feedstream downstream of the second exhaust purifying element 34, i.e., the particulate filter, and upstream of the second SCR catalyst 36. The second reductant delivery system 41 is configured to controllably supply a metered flow of reductant into the exhaust gas feedstream 15' upstream of the second SCR catalyst 36 to facilitate NOx reduction through the second SCR catalyst 36.

Operation of the second reductant delivery system 41 may be controlled by the second controller 18. The second reductant delivery system 41 is configured to controllably supply a metered flow of reductant into the exhaust gas feedstream upstream of the second SCR catalyst 36 to facilitate NOx reduction therethrough. The second controller 18 is operatively connected to the second reductant delivery system 41 and in communication with the second NOx sensor 48, a second temperature sensor 42, and a third temperature sensor 46. The second controller 18 includes a second instruction set 19 that is executable to control the second reductant delivery system 41 to inject reductant into the exhaust gas feedstream 15' upstream of the second SCR catalyst 36 based upon inputs from the various sensors.

Each of the first, second, third, and fourth exhaust purifying elements 32, 34, 36, and 38, respectively, includes a ceramic or metallic substrate having flow channels that have been coated with suitable materials that include by way of non-limiting examples: platinum-group metals such as platinum, palladium and/or rhodium; other metals, such as vanadium, copper, cerium, and/or other materials. The coated materials effect chemical reactions to oxidize, reduce, filter, or otherwise treat constituents of the exhaust gas feedstream under certain conditions related to temperature, flowrate, air/fuel ratio and others. The embodiment shown includes the elements of the exhaust aftertreatment system 100 in one arrangement, which is illustrative. Other arrangements of the elements of the exhaust aftertreatment system 100 may be employed within the scope of this disclosure, with such arrangements including the addition of other exhaust purifying elements and/or omission of one or more of the exhaust purifying elements, depending upon requirements of the specific application.

The sensors for monitoring the various exhaust purifying elements of the exhaust subsystem 30 include a second oxygen sensor 28 that is arranged in the exhaust gas feedstream downstream of the oxidation catalyst 32, the second (downstream) NOx sensor 48, and, in one embodiment, temperature sensors 42, 46. Other sensors (not shown) may include, for example, a particulate matter sensor, a delta pressure sensor for monitoring pressure drop across the SCR catalyst 36, additional temperature sensors, and/or other sensing devices and models for monitoring the exhaust gas feedstream. The second NOx sensor 48 may have wide-band air/fuel ratio sensing capability. Such sensors and models may be arranged to monitor or otherwise determine parameters relegated to the exhaust gas feedstream at specific locations. As such, the aforementioned sensors and/or models may be advantageously employed to monitor performance of individual ones of the exhaust purifying elements, monitor parameters associated with performance of a subset of the exhaust purifying elements, or monitor parameters associated with performance of the exhaust aftertreatment system 100.

The first controller 16 includes the instruction set 17 that is executable to control the first reductant delivery system 25 to inject the reductant into the exhaust gas feedstream 15 upstream of the first SCR catalyst 20, on systems that employ the first reductant delivery system 25. This includes the first instruction set 17 being executed to control the first reductant delivery system 25 to inject the reductant into the exhaust gas feedstream 15 upstream of the first SCR catalyst 20 to achieve a target reductant/NOx ratio that is input to the first SCR catalyst 20 to achieve a first target NOx reduction level, on systems that employ the first reductant delivery system 25. Alternatively, or in addition, the first controller 16 controls, via the first instruction set 17, the first reductant delivery system 25 to inject the reductant into the exhaust gas feedstream 15 upstream of the first SCR catalyst 20 to achieve a target ammonia storage level on the first SCR catalyst 20 in anticipation of a projected need for NOx reduction, and as part of controlling the exhaust gas feedstream that is input to the exhaust aftertreatment system 100.

The second controller 18 includes the second instruction set 19 that is executable to control the second reductant delivery system 41 to inject the reductant into the exhaust gas feedstream 15' upstream of the second SCR catalyst 36, on systems that employ the second reductant delivery system 41. The second instruction set 19 is executed to control the second reductant delivery system 41 to inject the reductant into the exhaust gas feedstream 15' upstream of the second SCR catalyst 36 to achieve a target reductant/NOx ratio that is input to the second SCR catalyst 36 to achieve a second target NOx reduction level. Alternatively, or in addition, the second controller 18 controls, via the second instruction set 19, the second reductant delivery system 41 to inject the reductant into the exhaust gas feedstream 15' upstream of the second SCR catalyst 36 to achieve a target ammonia storage level on the second SCR catalyst 36 in anticipation of a projected need for NOx reduction, and as part of controlling the exhaust gas feedstream that is input to the exhaust aftertreatment system 100.

Figure 2:
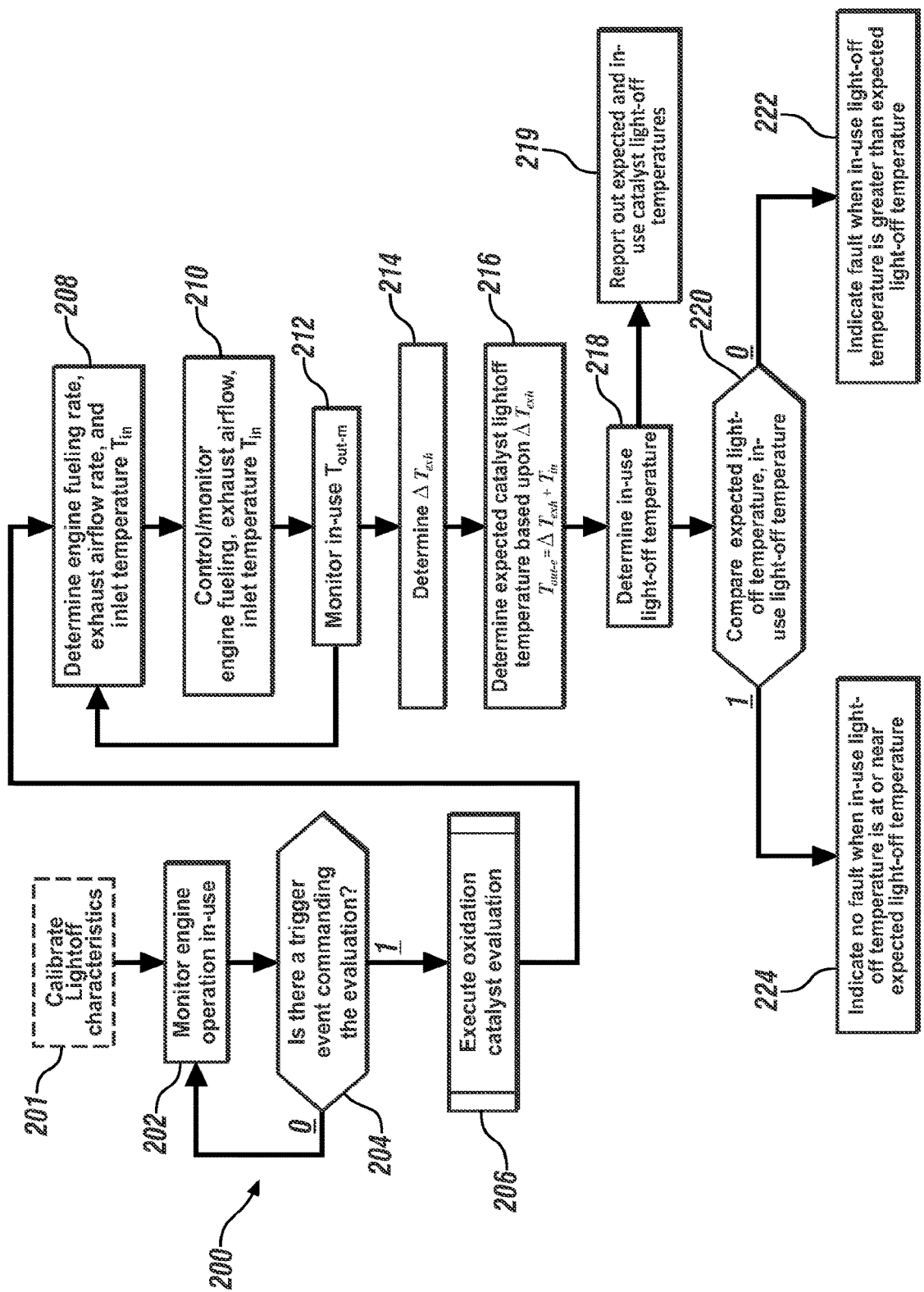
FIG. 2 schematically illustrates a flowchart for a control routine to monitor an oxidation catalyst that is arranged upstream of an SCR device of an embodiment of an exhaust aftertreatment system, in accordance with the disclosure.

Referring now to FIG. 2 with continued reference to an embodiment of the exhaust aftertreatment system 100 that is described with reference to FIG. 1, a method and/or monitoring algorithm 200 for evaluating the oxidation catalyst 32 is described. The concepts of the monitoring algorithm 200 may be applied to operation of various embodiments of an exhaust aftertreatment system for an internal combustion engine operating in a lean air/fuel ratio environment that has an oxidation catalyst arranged upstream of an SCR catalyst, and are not limited to the exhaust aftertreatment system 100 that is described with reference to FIG. 1. The monitoring algorithm 200 may be implemented as algorithmic code that is executable by the first controller 16 in one embodiment.

The operation of an oxidation catalyst can be evaluated under laboratory conditions by passing hydrocarbons through the oxidation catalyst over a range of temperatures and flowrates to determine a temperature at which the oxidation catalyst starts to oxidize the hydrocarbons, and thus determine the light-off temperature of the oxidation catalyst. A parameter related to a light-off temperature of the oxidation catalyst provides an approximation of its capability to oxidize HC, CO, and NO molecules. The oxidized NO molecules are useful in a downstream SCR catalyst for NOx reduction. Thus, the in-use light-off temperature of the oxidation catalyst provides an indication of its capability to reduce exhaust emissions.

The in-use light-off temperature of an oxidation catalyst may be determined by metering known quantities of HC over the oxidation catalyst at known exhaust parameters, e.g., flowrate, temperature, and air/fuel ratio, and creating a characteristic curve of HC conversion efficiency. An expected temperature increase across the oxidation catalyst can be estimated, approximated, or otherwise determined based upon a relationship between the inlet temperature, a fueling rate, an exhaust gas flowrate, and other factors. The expected temperature increase can be added to an inlet temperature to determine an expected outlet temperature of the oxidation catalyst, which can be used to determine an expected light-off temperature. A monitored exhaust temperature for the same operating conditions can be determined used feedback from one or more exhaust gas temperature sensors that are arranged downstream of the oxidation catalyst. Thus a benchmark of the oxidation catalyst condition can be determined and compared to performance of a new system.

Referring to the embodiment described in FIG. 1, the first heating element 22 is a controllable heating element that is arranged in the exhaust gas feedstream 15 upstream of the first SCR catalyst 20, and can be employed to control the exhaust gas to a temperature that is greater than a temperature that can be achieved by operation of the engine 10 alone. The ability to manipulate the exhaust gas temperature facilitates in situ measurement of the capability of the oxidation catalyst to oxidize HC at various temperatures, and thus determine an oxidation catalyst light-off temperature. The oxidation catalyst light-off temperature is the temperature at which the oxidation catalyst oxidizes 50% of the HC. The light-off temperature of a new oxidation catalyst can be determined during engine development as part of validation.

Referring again to FIG. 2, the concepts described with reference to the monitoring algorithm 200 include controlling temperature of the exhaust gas feedstream 15 employing the first heating element 22 and manipulating operation of the internal combustion engine 10 to control the inlet temperature over a temperature range to determine the in-use light-off temperature for the oxidation catalyst, thus providing an indication of the emissions reduction capability of the oxidation catalyst. The monitoring algorithm 200 is illustrated as a collection of blocks in a logical flow graph, which represents a sequence of operations that can be implemented in hardware, software, and/or firmware components that have been configured to perform the specified functions. In the context of software, the blocks represent computer instructions that, when executed by one or more processors, perform the recited operations. Furthermore, although the various steps shown in the flowchart diagram appear to occur in a chronological sequence, at least some of the steps may occur in a different order, and some steps may be performed concurrently or not at all. For convenience and clarity of illustration, the monitoring algorithm 200 is described with reference to the internal combustion engine 10 and exhaust aftertreatment system 100 shown in FIG. 1.

TABLE 1

| BLOCK | BLOCK CONTENTS |
|---|---|
| 201 | Calibrate light-off characteristics of oxidation catalyst |
| 202 | Monitor operation in-use |
| 204 | Is there a trigger event commanding an evaluation of the oxidation catalyst? |
| 206 | Execute Evaluation |
| 208 | Iteratively select fueling rate, exhaust airflow rate, inlet temperature |
| 210 | Control/monitor fueling rate, exhaust airflow, inlet temperature $T_{in}$ |
| 212 | Monitor in-use temperature $T_{out-m}$ |
| 214 | Determine $\Delta T_{exh}$ |
| 216 | Determine in-use light-off temperature based upon $\Delta T_{exh}$ |
| 219 | Report out in-use light-off temperature |
| 218 | Determine expected light-off temperature $T_{out-e} = \Delta T_{exh} + T_{in}$ |
| 220 | Compare expected light-off temperature, in-use light-off temperature |
| 222 | Indicate fault when in-use light-off temperature is greater than expected light-off temperature |
| 224 | Indicate no fault when in-use light-off temperature is at or near expected light-off temperature |

Execution of the monitoring algorithm 200 may proceed as follows. As employed herein, the term "1" indicates an answer in the affirmative, or "YES," and the term "0" indicates an answer in the negative, or "NO."

Prior to executing the monitoring algorithm 200 for in-use monitoring operation of the oxidation catalyst 32, an off-line evaluation may be conducted to characterize light-off temperature parameters for the oxidation catalyst 32 (Step 201). The characterization testing of the oxidation catalyst 32 may be performed off-vehicle and in a laboratory environment during engine and exhaust system development using a representative sample of the oxidation catalyst 32. The characterization testing may include controlling engine operation over a range of speed and load conditions (i.e., fuel) to control an inlet temperature to the oxidation catalyst while monitoring an outlet temperature from the oxidation catalyst and a corresponding hydrocarbon conversion efficiency. The light-off temperature is defined as the temperature at which the hydrocarbon conversion efficiency is 50%. The representative sample of the oxidation catalyst 32 may be subjected to an array of exhaust gas temperatures, fueling rates and exhaust gas flowrates to determine the oxidation catalyst light-off temperature. Details related to characterization testing to determine a light-off temperature for an oxidation catalyst under controlled environmental conditions are known, and thus not described herein. The parameters related to the target light-off temperature for an embodiment of the oxidation catalyst 32 can be captured and stored as a lookup table in a non-volatile memory device of the second controller 18 for reference during engine operation.

The monitoring algorithm 200 replicates on-vehicle a portion of the characterization testing described with reference to Step 201 to manipulate the exhaust gas temperature in situ and measure the capability of the oxidation catalyst to oxidize HC at various temperatures to determine an in-use oxidation catalyst light-off temperature.

Operation of the monitoring algorithm 200 proceeds as follows. Parameters of the internal combustion engine 10 and the exhaust aftertreatment system 100 are periodically monitored in-use (Step 202). This includes monitoring parameters related to engine speed and load, exhaust gas temperatures, operation(s) of the second reductant delivery system 41 that is upstream of the second SCR catalyst 36 and the first reductant delivery system 25 that is upstream of the first SCR catalyst 20, when employed, regeneration events for the second exhaust purifying element 34, i.e., the particulate filter that is positioned downstream of the oxidation catalyst 32, etc. This also includes monitoring for occurrence of faults, such as presence of a malfunction indicator code that is generated by an on-board diagnostic (OBD) algorithm 21 that may be executed by the engine controller 11.

The monitored engine parameters and other control and performance parameters are evaluated to determine if there is a triggering event that commands an evaluation of the oxidation catalyst 32 (204). Non-limiting examples of triggering events that may command the evaluation of the oxidation catalyst 32 include occurrence of an OBD fault code related to an element of the exhaust aftertreatment system 100, or occurrence of an excessive quantity of regeneration events for the particulate filter 34.

When no triggering events are present (Step 204(0)), operation of the internal combustion engine 10 continues to be monitored in-use. No further testing is executed.

When one or multiple triggering events are present (Step 204(1)), a request to evaluate the oxidation catalyst is generated (Step 206). The request to evaluate the oxidation catalyst 32 may be in the form of a request for an off-line, intrusive test, wherein the operation of the engine 10 is commanded to specific speed/load operating states on a dynamometer or another fixed environment, and elements of the aftertreatment system 100, e.g., the first heating element 22, are controlled to achieve a target temperature in the exhaust gas feedstream 15. Data parameters are then captured and analyzed according to steps 208 through 224.

Alternatively, the request to evaluate the oxidation catalyst 32 may be in the form of a passive in-use test, wherein operation of the engine 10 is monitored, and specific speed/load operating states are identified. Coincidently, elements of the aftertreatment system 100, e.g., the first heating element 22, may be controlled to achieve a target temperature in the exhaust gas feedstream 15. Data parameters can be captured and analyzed according to steps 208 through 224.

The request to evaluate the oxidation catalyst 32 may be communicated to an operator via an on-board dash lamp and/or an in-vehicle infotainment screen. Alternatively, or in addition, the request to evaluate the oxidation catalyst 32 may be wirelessly communicated to a vehicle service center. In either of these cases, the evaluation of the oxidation catalyst 32 may be intrusively performed after the engine 10 is made available in a stationary environment, such as a service center. The reporting out may be in the form of a report out of the catalyst light-off temperature (Step 219), and an indication of either a fault condition (step 222) or a no-fault condition (step 224).

The request to execute the evaluation of the oxidation catalyst 32 may instead be communicated to an on-vehicle controller, e.g., the engine controller 11, to request that the on-vehicle controller evaluate the oxidation catalyst 32 according to the procedure described in steps 210 through 220. Again, the reporting out may be in the form of a report out of the catalyst light-off temperature (Step 219), and an indication of either a fault condition (step 222) or a no-fault condition (step 224).

Prior to evaluating the oxidation catalyst 32, entry conditions are monitored to determine whether the exhaust aftertreatment system 100 is in condition to execute the monitoring algorithm 200 to achieve an accurate result. The entry conditions include, by way of non-limiting examples, determining that the exhaust aftertreatment system 100 is in a warmed-up condition, and determining that the upstream reductant delivery system, e.g., the first reductant delivery system 25, has been deactivated so that the first SCR catalyst 20 is not being used to actively reducing NOx emissions.

The evaluation of the oxidation catalyst 32 proceeds as follows. Operation of the internal combustion engine 10 is controlled and/or monitored to determine a fueling rate, an airflow rate in the exhaust gas feedstream 15, and an inlet temperature to the oxidation catalyst 32, i.e., inlet temperature $T_{in}$ (Step 210). The fueling rate includes fuel that is injected into the internal combustion engine for combustion power and for pass-through to the exhaust gas feedstream for oxidation in the oxidation catalyst 32. As such, the fueling rate may include one or a combination of engine combustion fuel injection and post-combustion fuel that is injected into the engine combustion chamber. The fueling rate may also include fuel that is injected into the exhaust gas feedstream upstream of the oxidation catalyst 32 that is intended for oxidation therein.

In one embodiment, the process to determine an expected outlet temperature from the oxidation catalyst ($T_{out\text{-}e}$) is a passive test in which parameters related to the fueling rate, the exhaust mass airflow, and the inlet temperature $T_{in}$ are monitored (Step 210). Coincidently, the exhaust gas temperature at the outlet of the oxidation catalyst 32, i.e., $T_{out-m}$, is monitored (Step 212). A temperature differential $\Delta T_{exh}$ is determined (Step 214), and the expected catalyst light-off temperature (Step 216) and an in-use catalyst light-off temperature (Step 218) are determined, evaluated, and reported out (Step 219).

In one embodiment, the process to determine the expected outlet temperature from the oxidation catalyst ($T_{out-e}$) is an intrusive test in which parameters related to the fueling rate, the exhaust mass airflow, and the inlet temperature $T_{in}$ are iteratively selected (Step 208) and operation of the internal combustion engine 10 and the first heating element 22 are controlled under steady-state conditions to achieve the selected parameters for fueling rate, exhaust mass airflow, and inlet temperature $T_{in}$ (Step 210). The exhaust gas temperature at the outlet of the oxidation catalyst 32, i.e., $T_{out-m}$, is monitored (Step 212), and the temperature differential $\Delta T_{exh}$ is determined (Step 214). The expected catalyst light-off temperature (Step 216) and an in-use catalyst light-off temperature (Step 218) are determined, evaluated, and reported out (Step 219). The iterative process replicates on-vehicle the array of exhaust gas temperatures, fueling rates and exhaust gas flowrates that are used to characterize the representative sample of the oxidation catalyst 32 to determine the oxidation catalyst light-off temperature as described in Step 201.

The evaluation of the in-use catalyst light-off temperature includes comparing the expected catalyst light-off temperature from Step 216 and the in-use catalyst light-off temperature from Step 212 (Step 220).

The temperature differential through the oxidation catalyst 32, i.e., $\Delta T_{exh}$ is determined based upon the engine operating parameters, the inlet temperature $T_{in}$, and the in-use outlet temperature $T_{out-m}$ (Step 214).

The temperature differential is determined based upon the following relationship:

$$\Delta T_{exh} = \left( \frac{\dot{m}_{HC} * LHV_{HC}}{Cp_{exh} * \dot{m}_{exh}} \right)$$

wherein:
$\Delta T_{exh}$ represents the temperature differential,
$\dot{m}_{HC}$ represents a mass flow rate of HC that is determined based upon the fueling rate,
$LHV_{HC}$ represents a lower heating value of fuel,
$Cp_{exh}$ represents a specific heat of the exhaust gas feedstream at a constant pressure, and
$\dot{m}_{exh}$ represents the mass flowrate of the exhaust gas feedstream.

The expected outlet temperature from the oxidation catalyst $T_{out-e}$ is determined by combining the temperature differential $\Delta T_{exh}$ and the inlet temperature of the exhaust gas feedstream upstream of the oxidation catalyst $T_{in}$, as follows (Step 218).

$T_{out-e} = T_{in} + \Delta T_{exh}$

The expected outlet temperature $T_{out-e}$ from Step 218 is compared with the in-use outlet temperature $T_{out-m}$ from Step 212 (Step 220).

When the expected outlet temperature $T_{out-e}$ is approximately equal to, or less than a threshold temperature difference from the in-use outlet temperature $T_{out-m}$ (Step 220)(1), no fault is indicated (Step 224), and this iteration of the monitoring algorithm 200 ends.

When the expected outlet temperature $T_{out-e}$ is greater than the in-use outlet temperature $T_{out-m}$ by greater than a threshold temperature difference (Step 220)(1), a fault is indicated (Step 222), and this result may be communicated to the vehicle operator and/or to the service center, and this iteration of the monitoring algorithm 200 ends. The fault may be in the form of an exhaust leak, a fractured or fragmented catalyst substrate, a degradation in catalytic performance due to poisoning or washcoat deterioration, etc. The threshold temperature difference is a calibratable value that is application-specific, and is determined based upon characteristics of the specific catalyst and exhaust aftertreatment system configuration, regulatory requirements, and other factors.

In this manner, an in situ test can be employed to determine an in-use oxidation catalyst light-off temperature by replicating a portion of the characterization testing described with reference to Step 201 by manipulating the exhaust gas temperature to measure the capability of the oxidation catalyst to oxidize HC at various temperatures to determine an in-use oxidation catalyst light-off temperature.

Figure 3:
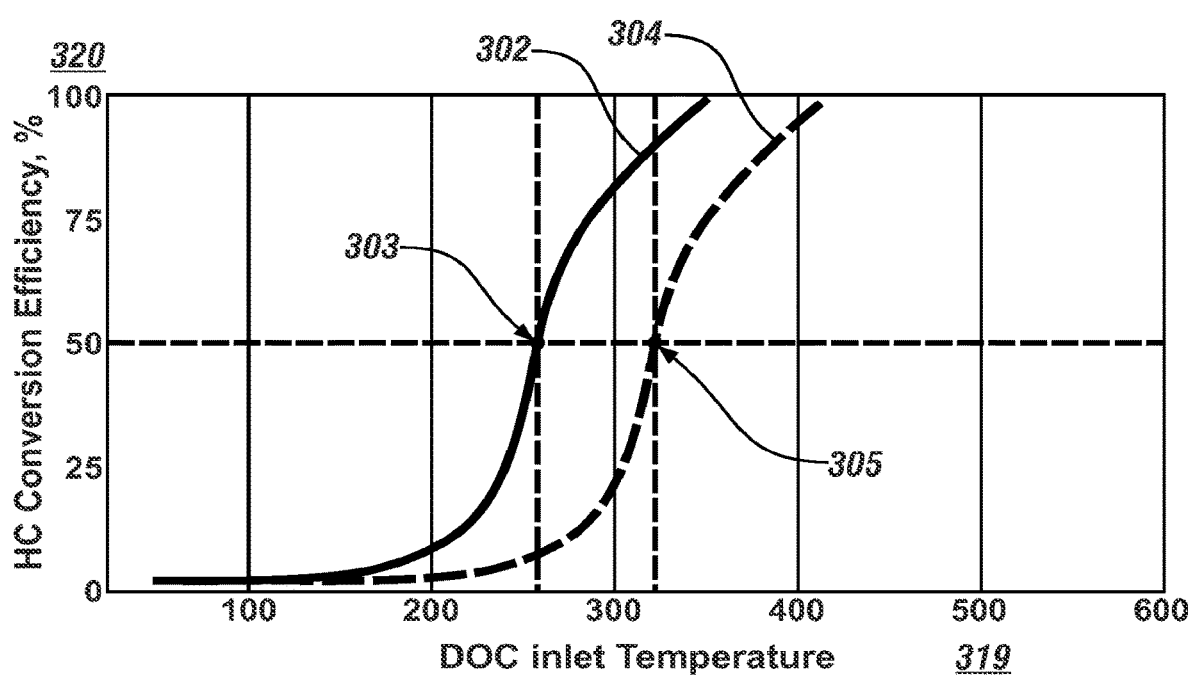
FIG. 3 graphically illustrates hydrocarbon conversion efficiency curves for a new oxidation catalyst and a degraded oxidation catalyst in relation to an inlet temperature for an embodiment of an oxidation catalyst, in accordance with the disclosure.

FIG. 3 graphically illustrates hydrocarbon conversion efficiency curves for a new oxidation catalyst (302) and a degraded oxidation catalyst (304) in relation to an inlet temperature for an embodiment of the oxidation catalyst 32 that is described with reference to FIG. 1. The inlet temperature 310 is depicted on the horizontal axis, and the hydrocarbon conversion efficiency 320 is depicted on the vertical axis. The light-off temperature is defined as the temperature at which the hydrocarbon conversion efficiency is 50%. A light-off temperature (303) for the new oxidation catalyst (302) and a light-off temperature (305) for degraded oxidation catalyst (304) are indicated. As shown, the light-off temperature increases as the hydrocarbon conversion efficiency degrades, and this characteristic can be used by the monitoring algorithm 200 to monitor the performance of the oxidation catalyst 32 in-use.

As used herein, the terms "system" and "subsystem" may refer to one of or a combination of mechanical and electrical devices, actuators, sensors, controllers, application-specific integrated circuits (ASIC), combinatorial logic circuits, software, firmware, and/or other components that are arranged to provide the described functionality. As employed herein, the term "upstream" and related terms refer to elements that are towards an origination of a flow stream relative to an indicated location, and the term "downstream" and related terms refer to elements that are away from an origination of a flow stream relative to an indicated location. As employed herein, the term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. As employed herein, the terms "calibration," "calibrated," and related terms refer to a result or a process that correlates a desired parameter and one or multiple perceived or observed parameters for a device or a system. A calibration as described herein may be reduced to a storable parametric lookup table, a plurality of executable equations or another suitable form that may be employed as part of a measurement or control routine. As employed herein, a parameter is defined as a measurable quantity that represents a physical property of a device or other element that is discernible using one or more sensors and/or a physical model. A parameter can have a discrete value, e.g., either "1" or "0,"

or can be infinitely variable in value. The use of ordinals such as first, second and third does not necessarily imply a ranked sense of order, but rather may only distinguish between multiple instances of an act or structure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

The devices and systems of the disclosure each have several innovative aspects, no single one of which is solely responsible or required for the desirable attributes disclosed herein. The various features described above may be used independently of one another, or may be combined in various ways. All possible combinations and subcombinations are intended to fall within the scope of this disclosure. Various modifications to the implementations described in this disclosure may be readily apparent to those of ordinary skill in the art, and the generic principles defined herein may be applied to other implementations. Thus, the claims are not intended to be limited to the implementations shown herein, but are to be accorded the widest scope consistent with this disclosure, the principles and the novel features disclosed herein.

Certain features that may be described in this specification in the context of separate implementations also may be implemented in combination in a single implementation. Conversely, various features that may be described in the context of a single implementation also may be implemented in multiple implementations separately or in any suitable subcombination. Moreover, although features may be described above as acting in certain combinations and even initially claimed as such, one or more features from a claimed combination can be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for monitoring an oxidation catalyst that is fluidly coupled to an exhaust gas feedstream of a compression-ignition internal combustion engine, the method comprising:
   operating the compression-ignition internal combustion engine and an exhaust gas heater under steady-state conditions such that an inlet temperature upstream of the oxidation catalyst, a fueling rate, and a mass flowrate of the exhaust gas feedstream are maintained;
   determining, via a first temperature sensor, an in-use outlet temperature downstream of the oxidation catalyst;
   determining, via a controller, an expected outlet temperature from the oxidation catalyst based upon the inlet temperature, the fueling rate, and the mass flowrate;
   evaluating performance of the oxidation catalyst based upon the expected outlet temperature from the oxidation catalyst and the in-use outlet temperature downstream of the oxidation catalyst; and
   determining whether a fault related to the oxidation catalyst is detected, the fault occurring when a difference between the expected outlet temperature from the oxidation catalyst and the in-use outlet temperature is greater than a threshold,
   in response to a fault not being detected, revising at least one of the inlet temperature, the fueling rate, and the mass flowrate such that the compression-ignition internal combustion engine and the exhaust gas heater are operated under steady-state conditions at a second inlet temperature, a second fueling rate, and a second mass flowrate, and
   in response to a fault being detected, reporting, via the controller, the fault to at least one of a vehicle operator and a vehicle service center.

2. The method of claim 1, wherein determining, via the controller, the expected outlet temperature from the oxidation catalyst based upon the inlet temperature, the fueling rate, and the mass flowrate of the exhaust gas feedstream comprises determining a temperature differential through the oxidation catalyst based upon the following relationship:

$$\Delta T_{exh} = \left( \frac{\dot{m}_{HC} * LHV_{HC}}{Cp_{exh} * \dot{m}_{exh}} \right)$$

wherein:
   $\Delta T_{exh}$ represents the temperature differential,
   $\dot{m}_{HC}$ represents a mass flow rate of HC that is determined based upon the fueling rate,
   $LHV_{HC}$ represents a lower heating value of fuel,
   $Cp_{exh}$ represents a specific heat of the exhaust gas feedstream at a constant pressure, and
   $\dot{m}_{exh}$ represents the mass flowrate of the exhaust gas feedstream, and
wherein determining the expected outlet temperature from the oxidation catalyst is based upon the temperature differential and the inlet temperature.

3. The method of claim 1, further comprising evaluating the performance of the oxidation catalyst based upon an expected light-off temperature for the oxidation catalyst and an in-use light-off temperature for the oxidation catalyst, wherein the in-use light-off temperature for the oxidation catalyst is determined based upon the in-use outlet temperature downstream of the oxidation catalyst.

4. The method of claim 3, wherein evaluating the oxidation catalyst based upon the expected light-off temperature for the oxidation catalyst and the in-use light-off temperature for the oxidation catalyst comprises detecting the fault related to the oxidation catalyst only when the in-use light-off temperature exceeds the expected light-off temperature by an amount that is greater than a threshold.

5. A method for monitoring an oxidation catalyst that is arranged upstream of an SCR catalyst in an exhaust gas feedstream of a compression-ignition internal combustion engine, the method comprising:
  operating the compression-ignition internal combustion engine and an exhaust gas heater under steady-state conditions such that an inlet temperature upstream of the oxidation catalyst, a fueling rate, and a mass flowrate of the exhaust gas feedstream are maintained;
  determining, via a first temperature sensor, an in-use outlet temperature downstream of the oxidation catalyst;
  determining, via a controller, an expected outlet temperature from the oxidation catalyst based upon the inlet temperature, the fueling rate, and the mass flowrate;
  evaluating performance of the oxidation catalyst based upon the expected outlet temperature from the oxidation catalyst and the in-use outlet temperature downstream of the oxidation catalyst; and
  determining whether a fault related to the oxidation catalyst is detected, the fault occurring when a difference between the expected outlet temperature from the oxidation catalyst and the in-use outlet temperature is greater than a threshold,
  in response to a fault not being detected, revising at least one of the inlet temperature, the fueling rate, and the mass flowrate such that the compression-ignition internal combustion engine and an exhaust gas heater are operated under steady-state conditions at a second inlet temperature, a second fueling rate, and a second mass flowrate, and
  in response to a fault being detected, reporting, via the controller, the fault to at least one of a vehicle operator and a vehicle service center.

6. The method of claim 5, wherein determining the temperature differential through the oxidation catalyst is based upon the following relationship:

$$\Delta T_{exh} = \left( \frac{\dot{m}_{HC} * LHV_{HC}}{Cp_{exh} * \dot{m}_{exh}} \right)$$

wherein:
  $\Delta T_{exh}$ represents the temperature differential,
  $\dot{m}_{HC}$ represents a mass flow rate of HC that is determined based upon the fueling rate,
  $LHV_{HC}$ represents a lower heating value of fuel,
  $Cp_{exh}$ represents a specific heat of the exhaust gas feedstream at a constant pressure, and
  $\dot{m}_{exh}$ represents the mass flowrate of the exhaust gas feedstream, and
wherein determining the expected outlet temperature from the oxidation catalyst is based upon the temperature differential and the inlet temperature upstream of the oxidation catalyst.

7. The method of claim 5, wherein detecting the fault related to the oxidation catalyst based upon the expected outlet temperature from the oxidation catalyst and the in-use outlet temperature downstream of the oxidation catalyst comprises detecting the fault when a difference between the expected outlet temperature from the oxidation catalyst and the in-use outlet temperature downstream of the oxidation catalyst is greater than a threshold.

8. A vehicle system, comprising:
  a lean-burn internal combustion engine;
  an exhaust aftertreatment system fluidly coupled to the internal combustion engine, the exhaust aftertreatment system including an oxidation catalyst;
  a first temperature sensor arranged to monitor the exhaust gas feedstream downstream of the oxidation catalyst; and
  a controller, in communication with the internal combustion engine, an exhaust gas heater, and the first temperature sensor; the controller including an instruction set that is executable to:
    operate the internal combustion engine and the exhaust gas heater under steady-state conditions such that an inlet temperature upstream of the oxidation catalyst, a fueling rate, and a mass flowrate of the exhaust gas feedstream are maintained;
    determine, via the first temperature sensor, an in-use outlet temperature of the exhaust gas feedstream downstream of the oxidation catalyst;
    determine an expected outlet temperature from the oxidation catalyst based upon the inlet temperature, the fueling rate, and the mass flowrate of the exhaust gas feedstream; and
    evaluate the oxidation catalyst based upon the expected outlet temperature and the in-use outlet temperature
  wherein in response to a fault not being detected, the instruction set is executable to revise at least one of the inlet temperature, the fueling rate, and the mass flowrate such that the compression-ignition internal combustion engine and the exhaust gas heater are operated under steady-state conditions at a second inlet temperature, a second fueling rate, and a second mass flowrate, and
  wherein in response to a fault being detected, the instruction set is executable to report, via the controller, the fault to at least one of a vehicle operator and a vehicle service center.

9. The vehicle system of claim 8, wherein the instruction set being executable to determine the expected outlet temperature from the oxidation catalyst based upon the inlet temperature, the fueling rate, and the mass flowrate of the exhaust gas feedstream comprises the instruction set being executable to determine a temperature differential based upon the following relationship:

$$\Delta T_{exh} = \left( \frac{\dot{m}_{HC} * LHV_{HC}}{Cp_{exh} * \dot{m}_{exh}} \right)$$

wherein:
  $\Delta T_{exh}$ represents the temperature differential,
  $\dot{m}_{HC}$ represents a mass flow rate of HC that is determined based upon the fueling rate,
  $LHV_{HC}$ represents a lower heating value of fuel,
  $Cp_{exh}$ represents a specific heat of the exhaust gas feedstream at a constant pressure, and
  $\dot{m}_{exh}$ represents the mass flowrate of the exhaust gas feedstream, and
wherein the instruction set being executable to determine the expected outlet temperature from the oxidation catalyst based upon the temperature differential and the inlet temperature of the exhaust gas feedstream upstream of the oxidation catalyst.

10. The vehicle system of claim 8, wherein the instruction set being executable to evaluate the oxidation catalyst based upon the expected outlet temperature from the oxidation catalyst and the in-use outlet temperature of the exhaust gas feedstream downstream of the oxidation catalyst comprises the instruction set being executable to determine whether a fault related to the oxidation catalyst is detected, the fault occurring when a difference between the expected outlet temperature from the oxidation catalyst and the in-use outlet temperature of the exhaust gas feedstream downstream of the oxidation catalyst is greater than a threshold.

11. The vehicle system of claim 8, wherein the exhaust aftertreatment system includes a selective catalytic reduction (SCR) catalyst arranged downstream of the oxidation catalyst.

* * * * *